United States Patent
McManus et al.

[19]

[11] Patent Number: 6,060,799
[45] Date of Patent: May 9, 2000

[54] MAGNET CARRIER FOR MOTOR HOUSING

[75] Inventors: Edward C. McManus, Livonia; David W. Lodge, Canandaigua, both of N.Y.

[73] Assignee: Webster Plastics, Fairport, N.Y.

[21] Appl. No.: 09/282,836

[22] Filed: Mar. 31, 1999

[51] Int. Cl.[7] .................................................. H02K 1/04
[52] U.S. Cl. ..................... 310/43; 310/154; 310/40 MM; 29/596
[58] Field of Search ............................. 310/43, 154, 156, 310/256, 261, 177, 152, 40 MM; 29/596, 598; 425/DIG. 33

[56] References Cited

U.S. PATENT DOCUMENTS

| | | | |
|---|---|---|---|
| 3,631,277 | 12/1971 | Ferdig et al. | 310/154 |
| 3,663,851 | 5/1972 | Persson | 310/154 |
| 3,789,250 | 1/1974 | Macoit et al. | 310/154 |
| 3,984,714 | 10/1976 | Grozinger et al. | 313/197 |
| 4,071,794 | 1/1978 | Schoen | 310/154 |
| 4,163,165 | 7/1979 | Purdy | 310/154 |
| 4,173,822 | 11/1979 | Futterer et al. | 291/596 |
| 4,237,393 | 12/1980 | Landgraf | 310/59 |
| 4,323,806 | 4/1982 | Aoki | 310/266 |
| 4,412,146 | 10/1983 | Futterer et al. | 310/266 |
| 4,414,481 | 11/1983 | Jong | 310/42 |
| 4,587,449 | 5/1986 | West | 310/154 |
| 4,591,749 | 5/1986 | Gauthier et al. | 310/156 |
| 4,665,333 | 5/1987 | Heim et al. | 310/154 |
| 4,682,066 | 7/1987 | Abbratozzato et al. | 310/154 |
| 4,707,630 | 11/1987 | Tomite et al. | 310/154 |
| 4,795,932 | 1/1989 | Long | 310/154 |
| 4,801,833 | 1/1989 | Dye | 310/239 |
| 4,851,729 | 7/1989 | Baines | 310/159 |
| 4,916,344 | 4/1990 | Hammer et al. | 310/239 |
| 4,954,736 | 9/1990 | Kawamoto et al. | 310/156 |
| 4,973,871 | 11/1990 | Bisantz | 310/154 |
| 5,105,114 | 4/1992 | Sickle et al. | 310/154 |
| 5,121,021 | 6/1992 | Ward | 310/154 |
| 5,159,222 | 10/1992 | Southall | 310/239 |
| 5,268,607 | 12/1993 | McManus | 340/239 |
| 5,281,881 | 1/1994 | Gentry et al. | 310/154 |
| 5,353,491 | 10/1994 | Gentry et al. | 29/596 |
| 5,391,063 | 2/1995 | Hantle | 417/423.7 |
| 5,584,114 | 12/1996 | McManus | 310/89 |
| 5,619,084 | 4/1997 | Lau | 310/154 |
| 5,675,204 | 10/1997 | Kusumoto et al. | 310/154 |
| 5,731,646 | 3/1998 | Heinze et al. | 310/89 |
| 5,874,794 | 2/1999 | Trammell et al. | 310/159 |
| 5,925,963 | 7/1999 | Yang | 310/259 |

*Primary Examiner*—Nestor Ramirez
*Assistant Examiner*—Joseph Waks
*Attorney, Agent, or Firm*—Eugene Stephens & Associates

[57] ABSTRACT

Permanent magnets are pre-positioned around an injection molded magnet carrier, and the magnet carrier together with the magnets is inserted through one end of a motor housing. Locating features of the magnet carrier position the magnets within the housing. Mounting features of the magnet carrier secure the magnets in place. Other features, including an end cap, can be appended to the magnet carrier to further aid assembly of the motor housing.

50 Claims, 4 Drawing Sheets

MAGNET CARRIER FOR MOTOR HOUSING

TECHNICAL FIELD

The invention relates to small electric motors having permanent magnets surrounded by flux rings. The permanent magnets are mounted in place against the flux rings.

BACKGROUND

Many small electric motors, particularly those used for powering automotive appliances, have housings formed from deep drawn or rolled and seam-sealed steel. The housings are cup-shaped and also function as flux rings and bearing retainers. The permanent magnets are inserted into the steel housings and secured in place against flux ring portions of the housings by a variety of fastening techniques including adhesives, spring clips, screws, and rivets.

Such fastening techniques are laborious and costly and lower the reliability of motor assemblies. The permanent magnets mounted in the housings are brittle and subject to cracking or breaking. Corners of the permanent magnets chip quite easily, particularly as a result of the handling required to mount and secure the magnets in the housings. Broken fragments of the magnets can become lodged between moving parts and compromise motor performance. Motor rejection rates can be quite high for this reason alone.

Composite motor housings combining molded resin housings and steel flux rings are a viable alternative to drawn or rolled steel housings. One example found in U.S. Pat. No. 5,584,114 to McManus, a co-inventor of this application, provides for overmolding a flux ring and an end bearing in place within a resin housing. Protrusions molded through openings in the flux ring provide mounting features for press-fitting magnets against the flux ring.

While this press-fitting technique is a more reliable way of mounting the magnets, other issues have delayed a wider commercial acceptance of composite motor housings. Drawn or rolled steel housings can be made quite cheaply and have the inherent advantage of functioning as flux rings.

U.S. Pat. No. 3,789,250 to Macoit et al. discloses a resin housing around which two flux members are separately attached. However, the two flux members do not support a closed flux path surrounding the magnets, which is important to support motor performance. Structural portions of the resin housing separate permanent magnets from a rotor path, which can further detract from performance.

Other housings are made with steel flux rings and resin or steel end caps. The steel flux rings can be shaped from sheet metal, and the end caps can be machined, cast, or molded in a simple form to support end bearings. Permanent magnets are still mounted similar to those in drawn steel cans and are subject to the same consequences.

SUMMARY OF INVENTION

Our invention in one or more of its embodiments extends some of the permanent magnet mounting advantages of resin molded motor housings to metal or composite housings. The magnets can be press-fitted into place against inner walls of the housings (or other pathways supporting a magnetic flux) as a part of a complete assembly that includes both the magnets and a magnet carrier. The magnets are first arranged on the magnet carrier, and the magnet carrier together with the magnets is inserted through one end of the housing.

The magnet carrier, which can be injection molded as a simple and inexpensive part, can be formed with a variety of features to aid motor assembly or to improve reliability of motor performance. For example, the magnet carrier can include magnet locating features for pre-positioning the magnets relative to each other and can include a stop or other carrier locating features to position the carrier with respect to the motor housing so that upon insertion of the carrier, the magnets are correctly positioned in the motor housing. The carrier can also be resiliently biased to retain the magnets in place against the housing in a press-fitting (frictional) engagement.

Motor reliability can be greatly enhanced by forming shields in the carrier to protect edges of the magnets during assembly and to protect the mechanical operating space of the motor from magnet fragments during use. The shields, which can be formed by thin webs of material, cover the magnet edges to protect the magnets from chipping. Once assembled, the shields capture any magnet fragments that may become loose between the carrier and the motor housing, without significantly decreasing the mechanical operating space. The shields preferably cover at least the corners of the magnets but can also cover both end and side edges of the magnets.

The carrier can also be formed together with an end cap at one end of the motor housing and with connectors at the other end of the motor housing. The end cap can incorporate an integral bearing or bearing mount as well as heat dissipation elements; and the connectors can include various snap-fit, locating, or mounting features to aid the connection of the motor housing with the remaining motor drive or end frame. The carrier can also be formed with locating or mounting features for other motor components including electrical brush cards, timers, pickups, and sensors.

DRAWINGS

DETAILED DESCRIPTION

Figure 1:
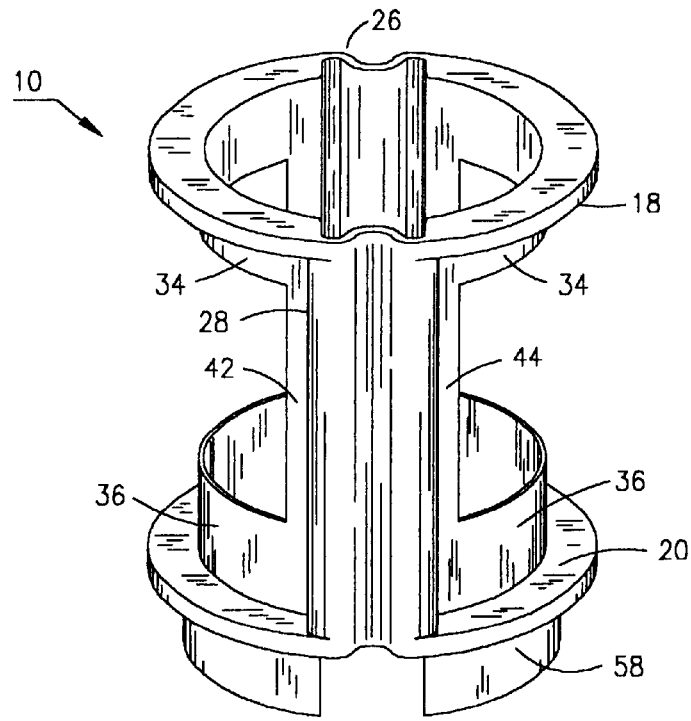
FIG. 1 is a perspective view of our new magnet carrier.

One example 10 of our new magnet carrier is illustrated in the perspective view of FIG. 1. Permanent magnets 12 are added to the carrier in the perspective view of FIG. 2. A series of planar views in FIGS. 3–6 show the carrier 10 and magnets 12 mounted within a motor housing flux ring 14—a term covering a magnetically permeable member supporting a closed flux path surrounding the magnets 12.

Preferably, the carrier 10 is injection molded of a resin material such as a commodity plastic or an engineering resin consistent with its intended use. Injection moldable metals and thermoset materials could also be used. Fillers, such as glass, long glass, steel, steel fiber, minerals, glass spheres, conductive and non-conductive materials, magnetic materials, barium ferrite, and rare earth materials can be incorporated into the moldable material for known structural or functional reasons. In addition to injection molding, the carrier 10 can also be fashioned from a variety of other fabrication techniques including sheet metal stamping and forming, machining, die casting, powdered metallurgy, and lithography.

The carrier 10 has a central axis 16 and top and bottom axial locators 18 and 20 that are spaced along the central axis 16. The top and bottom axial locators 18 and 20 cover top and bottom ends 22 and 24 of the magnets 12 for limiting movement of the magnets 12 along the central axis 16. Circumferential locators 26 and 28 interconnect the two axial locators 18 and 20 and abut linear sides 30 and 32 of the magnets for limiting angular movement of the magnets around the central axis 16.

Top and bottom end shields 34 and 36 project at right angles from the top and bottom axial locators 18 and 20 and extend between the two circumferential locators 26 and 28 to cover inner edges 38 and 40 of the magnet ends 22 and 24. Side shields 42 and 44 project from the circumferential locators 26 and 28 and extend between the top and bottom axial locators 18 and 20 to cover inner edges 46 and 48 of the magnet linear sides 30 and 32. The end and side shields 34, 36 and 42, 44 can be made quite thin (e.g., 0.25 mm) to avoid interfering with motor operation. The end and side shields 34, 36 and 42, 44 also function as seals for preventing any magnet fragments from the ends 22 and 24 or linear sides 30 and 32 of the magnets 12 from entering the mechanical operating space inside the motor housing flux ring 14. The top and bottom end shields 34 and 36 also function as radial locators for limiting movement of the magnets 12 towards the central axis 16 of the carrier 10.

Figure 2:
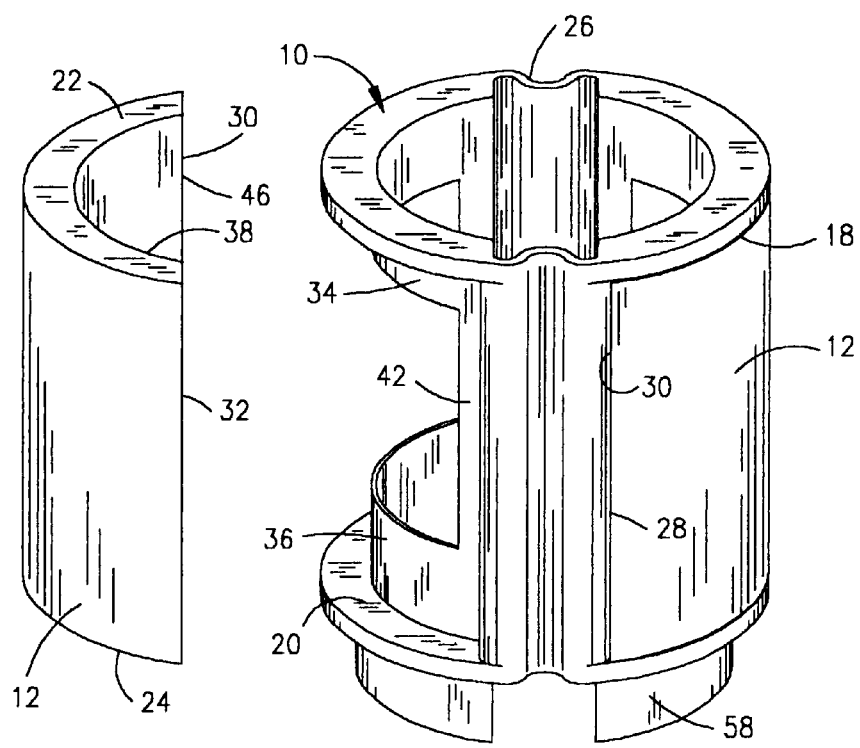
FIG. 2 is a similar perspective view with permanent magnets mounted in place around the carrier.
Figure 3:
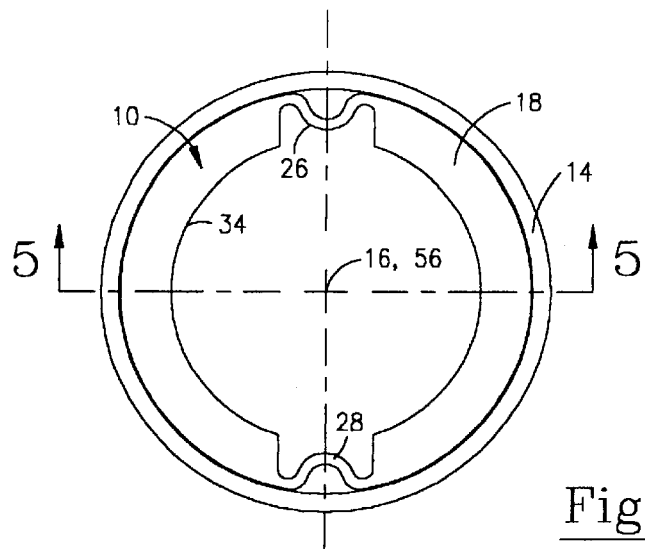
FIG. 3 is an end view of the magnet carrier mounted within a motor housing flux ring.
Figure 4:
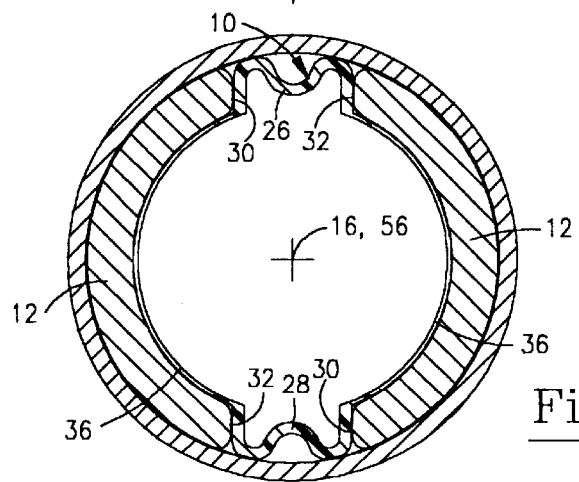
FIG. 4 is a cross-sectional end view of the magnet carrier taken along line 4—4 of FIG. 5.
Figure 5:
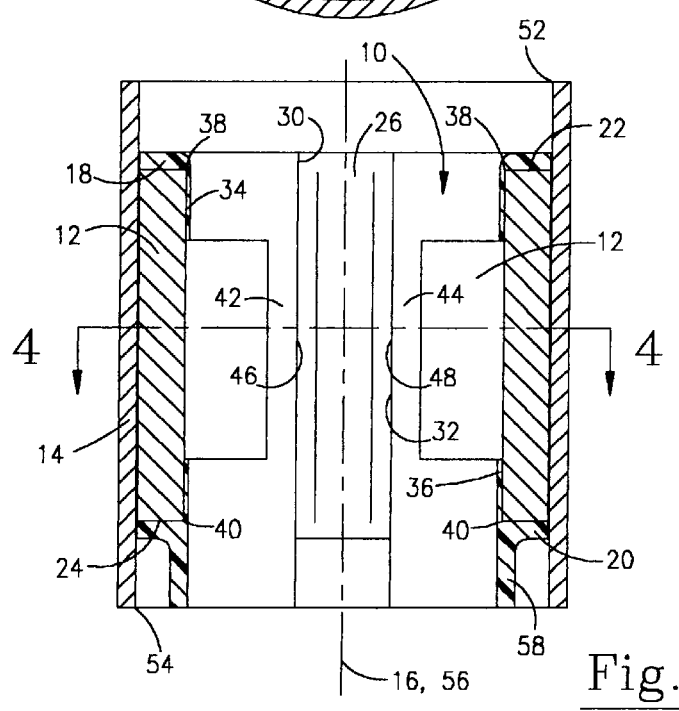
FIG. 5 is a cross-sectional side view of the magnet carrier and flux ring taken along line 5—5 of FIG. 3.

After the magnets 12 are positioned around the carrier 10 (as shown in FIG. 2), the carrier 10 together with the magnets 12 can be inserted through one of the open ends 52 and 54 of the flux ring 14. The circumferential locators 26 and 28 function as guides for directing the carrier 10 along a central axis 56 of the flux ring 14. Preferably, the circumferential locators 26 and 28 are flexible to provide clearance for the magnets 12 to also enter the flux ring 14. An axial taper of the circumferential locators 26 and 28 can be provided to progressively reduce a radial clearance of the magnets 12 as a function of their advancement along the flux ring axis 56.

Projecting from an opposite side of the axial locator 20 is an annular-shaped stop 58 that is intended to abut a housing feature (not shown) for limiting movement of the carrier 10 along the axis 56. Ribbed or other locating structures could also be used as stops. At the stop position, the central axis 16 of the carrier 10 and the central axis 56 of the flux ring are aligned, and spring forces exerted by the circumferential locators 26 and 28 retain the magnets 12 in their required operative positions against the flux ring 14. Although preferably curvilinear in axial section to promote flexibility and resilience, the circumferential locators could also be formed as solid blocks that are sufficiently compressible or tapered to perform these functions.

Figure 6:
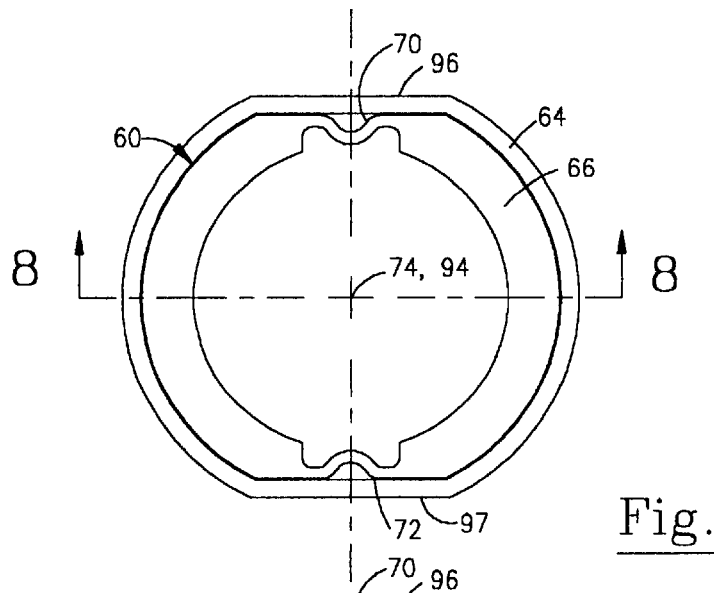
FIG. 6 is an end view of an alternative magnet carrier mounted within a D-shaped motor housing flux ring.
Figure 7:
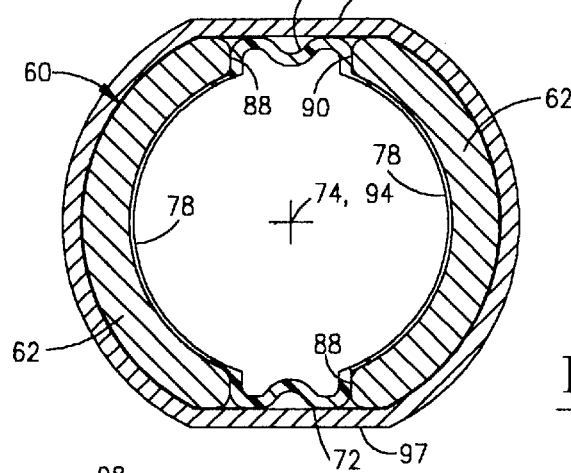
FIG. 7 is a cross-sectional end view of the alternative magnet carrier taken along line 7—7 of FIG. 8.
Figure 8:
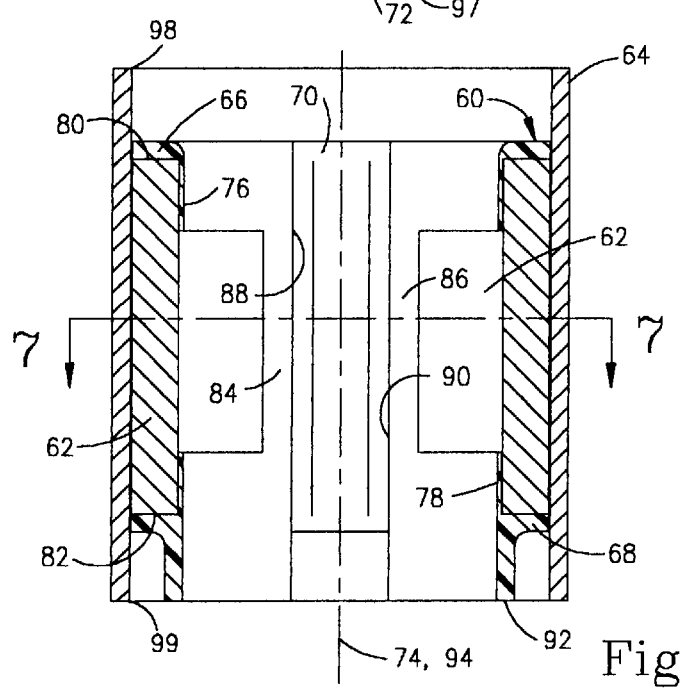
FIG. 8 is a cross-sectional side view of the alternative magnet carrier and flux ring taken along line 8—8 of FIG. 6.

FIGS. 6–8 illustrate an alternative magnet carrier 60 that is arranged to support permanent magnets 62 within a D-shaped flux ring 64. Many of the features except for those required to accommodate the differently shaped flux ring 64 are similar to those of the preceding example. Top and bottom axial locators 66 and 68 and circumferential locators 70 and 72 preposition the magnets 62 with respect to each other about a central axis 74 of the carrier 60. The circumferential locators 70 and 72 are resilient to aid both the assembly and the retention of the magnets 62 inside the flux ring 64.

Top and bottom end shields 76 and 78 seal top and bottom ends 80 and 82 of the magnets 62 and side shields 84 and 86 seal linear sides 88 and 90 of the magnets 62, providing similar protection against magnet fragments interfering with motor operation. Annular stop 92 limits movement of the carrier 60 along a central axis 94 of the flux ring 64. The circumferential locators 70 and 72, which also function as carrier guides, engage flattened portions 96 and 97 of the flux ring 64 to angularly orient the magnets 62 within the flux ring 64.

The magnets 62 can be located around the carrier 60 as provided by the axial and circumferential locators 66, 68 and 70, 72 and inserted with the carrier through an open end 98 or 99 of the flux ring 64. If an end cap (not shown) is already attached to the flux ring 64 (or formed integrally therewith), the carrier 60 can be moved along the axis 94 until the stop 92 makes contact with the end cap. Alternatively, the end cap could be added later and the stop 92 could abut a temporary fixture prior to the end cap being mounted in place.

Figure 9:
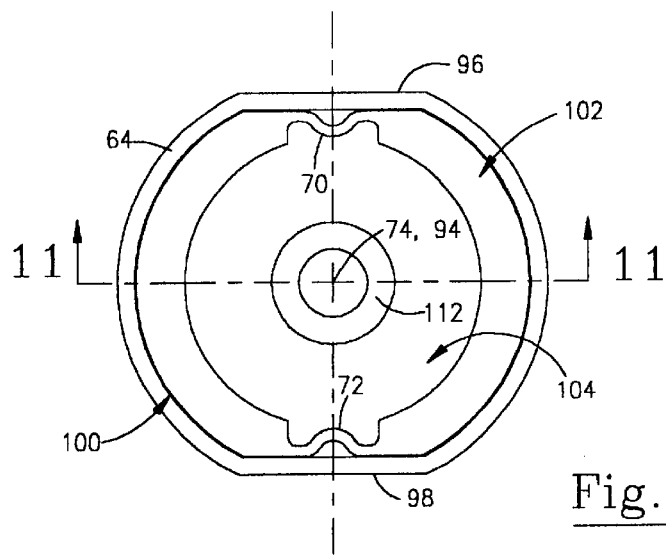
FIG. 9 is an end view of an alternative magnet carrier and end cap mounted within a D-shaped motor housing flux ring.
Figure 10:
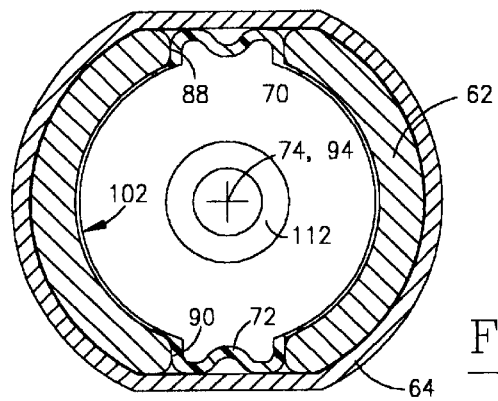
FIG. 10 is a cross-sectional end view of the alternative magnet carrier and end cap taken along line 10—10 of FIG. 11.
Figure 11:
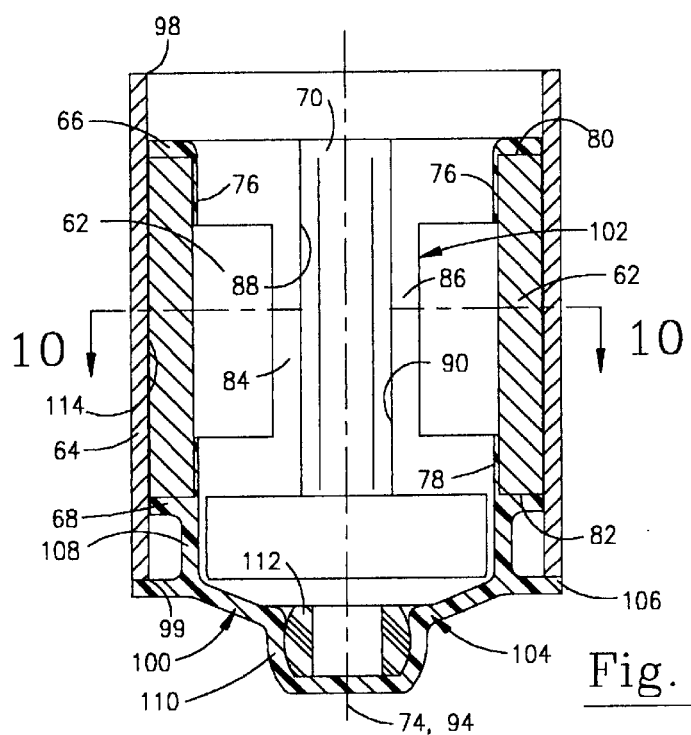
FIG. 11 is a cross-sectional side view of the alternative magnet carrier and end cap assembled with a flux ring taken along line 11—11 of FIG. 9.

FIGS. 9–11 illustrate a combined injection molded magnet carrier and end cap 100. A carrier portion 102 includes features similar to those of the preceding examples. Corresponding features are called out with the same reference numerals as in FIGS. 6–8. However, beyond the axial locator 82 of the carrier portion 102 is an end cap portion 104, which includes additional features. For example, the end cap portion 104 includes a flange 106 that forms a stop against the flux ring 64. A spacer 108, which was formerly the stop of the preceding embodiment, axially positions the carrier portion 102 with respect to the stop position of the end cap flange 106. Also within the end cap portion 104 is a bearing mount 110 containing a bearing 112 that supports rotation around the flux ring axis 94.

For purposes of assembly, the magnets 62 are prepositioned around the carrier portion 102, and the carrier portion is inserted through the open end 99 of the flux ring 64 until the flange 106 of the end cap portion 104 contacts the open end 99 of the flux ring 64. The axial and circumferential locators position the magnets 62 in desired positions against an inner surface 110 of the flux ring 64. The circumferential locators 70 and 72 exert a spring biasing force to retain the magnets 62 in these desired positions.

The combined injection molded magnet carrier and end cap 100, similar to the carriers 10 and 60 of the preceding embodiments, is preferably injection molded as a single component using conventional side drawn molds. However, the carrier and the end cap or even the carrier itself could be formed in parts, such as two ends that join together to form locating surfaces for pre-positioning and subsequently mounting the magnets. In addition to or as an alternative to forming an end cap at one end of the carrier, other features that aid in the assembly of the motor housing or in the operation of the motor can be appended to the carrier. For example, features can be provided for locating or mounting additional components such as brush cards, timing devices, pickups, and sensors. Locating or fastening features can also be added to mount the motor housing to an end frame or its intended drive. Such features, which can include pedestals or snap-fit projections, preferably extend from the axial locators. The end cap can also include a thermally conductive element in thermal contact with the bearing mount to further manage heat dissipation into the surrounding environment.

Although only two magnets are shown in the preceding drawings, additional magnets can be pre-positioned on similar carriers and inserted into flux rings in the same way. The carrier can also be used to pre-position and mount permanent magnets against surrounding flux rings in a variety of motor designs including D.C., A.C., or brushless motors. The carrier is also intended as a permanent part of such motor assemblies but does so while avoiding complexities associated with overmolding the flux ring.

We claim:

1. A locating and retaining device for mounting magnets inside a flux ring of a motor housing comprising:

a magnet carrier having a central axis and magnet locating features that pre-position the magnets with respect to each other around the central axis;

said carrier being insertable together with the magnets through an opening in one end of the flux ring into a position that engages the magnets against an inner surface of the flux ring;

said carrier providing for retaining the magnets in operative positions against the flux ring;

said magnet locating features including axial locators that engage opposite ends of the magnets and circumferential locators that engage opposite sides of the magnets; and said circumferential locators extending along an entire axial length of said carrier having spring shapes that allow said carrier together with said axial locators to be circumferentially compressed upon insertion into the flux ring while exerting a biasing force against the sides of the magnets for limiting an angular movement of the magnets around the central axis of the magnet carrier.

2. The device of claim 1 in which said carrier also includes a carrier locating feature that positions the carrier with respect to the flux ring.

3. The device of claim 2 in which said carrier locating feature includes a stop for limiting an axial movement of the magnet carrier along a central axis of the flux ring.

4. The device of claim 3 in which said stop engages a feature of the motor housing.

5. The device of claim 3 in which said stop engages one end of the flux ring.

6. The device of claim 2 in which said circumferential locators are also shaped for angularly orienting the carrier within the flux ring.

7. The device of claim 6 in which said circumferential locators direct said carrier along a central axis of the flux ring.

8. The device of claim 1 in which said circumferential locators are curvilinear in cross section.

9. The device of claim 1 in which said axial locators limit an axial movement of the magnets along the central axis of the carrier.

10. The device of claim 9 in which said axial locator covers one end of the magnets.

11. The device of claim 9 in which said axial locator is one of a pair of axial locators that cover opposite ends of the magnets.

12. The device of claim 9 in which an end shield projects from the axial locator to isolate the one end of the magnets from mechanically operational space inside the flux ring.

13. The device of claim 11 in which said circumferential locators interconnect the axial locators.

14. The device of claim 13 in which said circumferential locators cover linear sides of the magnets.

15. The device of claim 1 in which said circumferential locators are shaped to progressively reduce clearance between the magnets and the flux ring as a function of an advancement of the magnet carrier into the flux ring.

16. The device of claim 15 in which said circumferential locators are tapered to progressively reduce clearance between the magnets and the flux ring as a function of an advancement of the magnet carrier into the flux ring.

17. The device of claim 14 in which side shields project from the circumferential locators to isolate the linear sides of the magnet from mechanically operational space inside the flux ring.

18. The device of claim 1 in which edge shields seal ends of the magnets from the interior space of the flux ring.

19. The device of claim 18 in which said edge shields seal linear sides of the magnets from the interior space of the flux ring.

20. The device of claim 19 in which the edge shields seal the linear sides and ends of the magnets without completely isolating the magnets from interior space within the flux ring.

21. The device of claim 1 further comprising an end cap that extends from the carrier to cover one end of the flux ring.

22. The device of claim 21 in which said end cap includes a stop for limiting axial movement of the carrier along a central axis of the flux ring.

23. The device of claim 21 in which said end cap includes a mounting for a bearing that supports rotation around a central axis of the flux ring.

24. The device of claim 1 in which said carrier is molded.

25. The device of claim 24 in which said carrier is molded of a resin material.

26. A method of mounting magnets in a flux ring comprising the steps of:

arranging the magnets around a carrier having a central axis, axial locators that position the magnets along the central axis, and circumferential locators that position the magnets around the central axis;

inserting the carrier together with the magnets through one end of the flux ring also having a central axis;

circumferentially compressing the carrier together with said axial locators through said circumferential locators having spring shapes that extend along an axial length of the carrier to permit advancement of the carrier together with the magnets along the central axis of the flux ring; and biasing the magnets with the circumferential locators into an operative engagement with the flux ring between the carrier and an inner surface of the flux ring.

27. The method of claim 26 in which said step of arranging includes moving the magnets into positions against the locators.

28. The method of claim 26 in which said step of arranging includes axially locating the magnets along the central axis of the carrier.

29. The method of claim 28 in which said step of arranging includes circumferentially locating the magnets around the central axis of the carrier.

30. The method of claim 26 in which said step of inserting includes aligning the central axis of the carrier with a central axis of the flux ring.

31. The method of claim 30 in which said step of inserting includes translating the carrier along the central axis of the flux ring until a stop is reached.

32. The method of claim 26 in which said step of biasing includes progressively increasing the biasing of the magnets against the flux ring as a function of the position of the carrier along the central axis of the flux ring.

33. The method of claim 26 including a further step of shielding ends of the magnets from mechanical operating space within the flux ring.

34. The method of claim 26 including a further step of shielding linear sides of the magnets from mechanical operating space within the flux ring.

35. The method of claim 26 in which the carrier is molded separately from the flux ring.

36. The method of claim 26 in which said step of inserting also includes moving an end cap with the magnets to desired positions with respect to the flux ring.

37. A method of mounting magnets in a flux ring comprising the steps of:

pre-positioning a plurality of magnets against locating features of an injection molded magnet carrier;

moving the carrier together with the magnets along an axis of the flux ring; and generating a spring force directed substantially along a circumference of the carrier that progressively increases in magnitude as a function of a position of the carrier along the axis of the flux ring to secure the magnets in place.

38. The method of claim 37 in which said step of pre-positioning includes axially locating the magnets along a central axis of the carrier.

39. The method of claim 38 in which said step of pre-positioning includes circumferentially locating the magnets around the central axis of the carrier.

40. The method of claim 37 in which said step of moving includes using the locating features to guide the magnets along the axis of the flux ring.

41. The method of claim 37 in which said step of generating includes generating the spring force by resiliently biasing the locating features.

42. The method of claim 37 in which the step of moving includes moving the carrier together with an appended end cap until the end cap contacts one end of the flux ring.

43. A motor housing assembly comprising:

a molded magnet carrier having locating features for pre-positioning a plurality of magnets with respect to each other;

one of said locating features being formed with a taper for progressively biasing the magnets against a flux ring as a function of a position of the molded magnet carrier within the flux ring; and a molded end cap appended to the molded magnet carrier and movable together with the molded magnet carrier to insert magnets through one end of the flux ring and to cover the one end of the flux ring with the molded end cap.

44. The assembly of claim 43 in which the molded magnet carrier and the molded end cap are formed together within a common mold.

45. The assembly of claim 43 in which the molded end cap forms a stop for positioning the magnet carrier within the flux ring.

46. The assembly of claim 45 in which a spacer positions the molded magnet carrier with respect to the molded end cap.

47. The assembly of claim 43 in which the molded magnet carrier provides for retaining the magnets in operative positions against the flux ring.

48. The assembly of claim 43 in which the molded magnet carrier includes axial locating features that position the magnets along a central axis of the carrier.

49. The assembly of claim 43 in which the molded magnet carrier includes circumferential locating features that position the magnets around a central axis of the carrier and form the taper for progressively biasing the magnets.

50. The assembly of claim 43 in which the molded magnet carrier includes shields that seal edges of the magnets from mechanical operating space within the flux ring without entirely covering the magnets.

* * * * *